(12) United States Patent
D'Amico et al.

(10) Patent No.: US 8,680,729 B2
(45) Date of Patent: Mar. 25, 2014

(54) MOTOR DRIVE PARTICULARLY FOR SUBMERSED ELECTRIC PUMPS

(75) Inventors: Sebastiano D'Amico, Vicenza (IT); Ugo Turetta, Arcugnano (IT); Andrea Fongaro, Altavilla Vicentina (IT)

(73) Assignee: Sumoto S.r.L. (IT)

(*) Notice: Subject to any disclaimer, the term of this patent is extended or adjusted under 35 U.S.C. 154(b) by 91 days.

(21) Appl. No.: 13/145,395

(22) PCT Filed: Mar. 5, 2009

(86) PCT No.: PCT/IT2009/000081
§ 371 (c)(1),
(2), (4) Date: Jul. 20, 2011

(87) PCT Pub. No.: WO2010/100659
PCT Pub. Date: Sep. 10, 2010

(65) Prior Publication Data
US 2011/0305587 A1    Dec. 15, 2011

(51) Int. Cl.
*F04B 35/04*    (2006.01)

(52) U.S. Cl.
USPC ............................................. 310/87

(58) Field of Classification Search
CPC ........... F04B 35/00; F04B 35/04; H02K 5/10; H02K 5/12
USPC ................... 310/87; 417/423.3, 423.1, 423.8
See application file for complete search history.

(56) References Cited

U.S. PATENT DOCUMENTS

| 2,233,672 A | * | 3/1941 | Mason ........................... 310/87 |
| 4,546,300 A | * | 10/1985 | Shaikh ......................... 318/786 |
| 4,808,896 A | | 2/1989 | Katsuragi et al. |

FOREIGN PATENT DOCUMENTS

| GB | 2345387 | 7/2000 |
| JP | 56171550 | 12/1981 |
| JP | 60129553 | 8/1985 |

* cited by examiner

*Primary Examiner* — Charles Freay
*Assistant Examiner* — Patrick Hamo
(74) *Attorney, Agent, or Firm* — R. Neil Sudol; Henry D. Coleman

(57) ABSTRACT

A motor drive, particularly for submersed electric pumps, has a jacket closed hermetically by a bottom and a head in order to form a first hermetic chamber, which contains an electric motor that is immersed in a bath of dielectric cooling liquid; the jacket is associated with an enclosure in order to form a second hermetic chamber, which contains a power supply and control unit connected to the electric motor. The motor drive includes a compensation means that balances the variations in volume of the dielectric cooling liquid and generates an overpressure within the first hermetic chamber, the first hermetic chamber is substantially independent of the second hermetic chamber.

12 Claims, 7 Drawing Sheets

MOTOR DRIVE PARTICULARLY FOR SUBMERSED ELECTRIC PUMPS

BACKGROUND OF THE INVENTION

The present invention relates to a motor drive particularly for submersed electric pumps.

As is known, submersed electric pumps are constituted by a multistage pumping unit associated with a submersed electric motor.

Submersed electric motors are substantially constituted by a cylindrical casing, which is closed hermetically by a head and a bottom and is adapted to contain a stator within which a rotor connected to the motor shaft rotates.

Very often, the stator and the rotor are immersed in a bath of dielectric cooling liquid that fills the casing completely in order to optimize the cooling of the submersed motor.

Exchange of liquids between the inside and the outside of the casing is prevented by a rotary mechanical seal, which is arranged at the output of the motor shaft. The seal is substantially constituted by a rotating ring, which rotates jointly with the shaft, and by a stationary ring, which is fixed to the casing. The two rings, which move with a relative motion, are mutually n contact by virtue of highly polished faces and the contact force is generally ensured by springs.

The volume of the dielectric cooling liquid varies according to both the operating temperature of the motor itself and the value of the pressure of the environment in which the motor is located. In order to allow variations of the volume of the dielectric cooling liquid, generally an elastic compensation membrane is provided at the bottom of the casing. The membrane is adapted to ensure that the pressure inside the casing is substantially equal to the outside pressure.

However, in some cases, the presence of conventional membranes can be disadvantageous.

It must in fact be noted that submersed electric motors are more and more often associated with power supply and control units, specifically inverters, which ensure a more efficient use of the motors.

In order to compact the dimensions and prevent the generation of overvoltages that might compromise the electric motor, the power supply and control units must be placed as close as possible to the motor. Accordingly, the casing very often includes both the electric motor and the power supply and control unit.

In those cases, a simple conventional membrane on the bottom of the casing is absolutely counterproductive, because by making the pressure inside the casing substantially equal to the outside pressure, all the electronic components are ultimately subjected to the action of the hydrostatic pressure.

However, the hydrostatic pressure can reach very high values and its conditions are highly variable as a function of the depth of the submersed motor with respect to the surface of the liquid in which it is submersed.

In such cases, the power supply and control unit therefore ultimately finds itself in a particularly disadvantageous situation and its electronic components are exposed to severe risk of damage.

It must also be noted that the substantial equivalence between the pressure inside the casing and the outside pressure is scarcely favorable also in the action for contrasting the leaks of dielectric cooling liquid through the rotary mechanical seal.

In the described pressure conditions, the task of ensuring contact between the rotating ring and the stationary one is entrusted completely to the springs that press the sliding fronts of the rings face to face.

Although the thrust of the springs may be sufficient to maintain tightness when the cooling liquid is cold and therefore denser, their mechanical action can turn out to be inadequate when the liquid becomes more fluid due to the heating of the motor, caused for example by the application of a load.

OBJECTS OF THE INVENTION

The aim of the invention is therefore to solve the problems described above, by providing a motor drive, particularly for submersed electric pumps, which is physically associated with a power supply and control unit and is at the same time capable of balancing the volume variations of the dielectric cooling liquid and of providing optimum physical conditions both to the electric motor and to the power supply and control unit.

Within the scope of this aim, a particular object of the invention is to provide a motor drive in which a pressure that is slightly higher than the hydrostatic pressure, such as to increase the thrust of the springs with which the rotary mechanical seal is provided, is reached during operation inside the casing that contains the electric motor, while a substantially stable pressure is maintained within the enclosure that contains the power supply and control unit.

A further object of the invention is to provide a motor drive in which the physical conditions reached within the casing that contains the electric motor are independent of those that are present in the enclosure that contains the power supply and control unit.

A further object of the invention is to provide a motor drive that is capable of minimizing the leaks of dielectric cooling.

A further object of the invention is to provide a motor drive that is able to operate with the highest possible operating temperature for an equal hydrostatic pressure.

SUMMARY OF THE INVENTION

This aim, as well as these and other objects that will become better apparent hereinafter, are achieved by a motor drive, particularly for submersed electric pumps, comprising a jacket closed hermetically by a bottom and by a head in order to form a first hermetic chamber, said first hermetic chamber containing an electric motor that is immersed in a bath of dielectric cooling liquid, said jacket being associated with an enclosure in order to form a second hermetic chamber, said second hermetic chamber containing a power supply and control unit that can be connected to said electric motor, said motor drive being characterized in that it comprises a compensation means that balances the variations in volume of said dielectric cooling liquid and generates an overpressure within said first hermetic chamber, said first hermetic chamber being substantially independent of said second hermetic chamber.

BRIEF DESCRIPTION OF THE DRAWINGS

Further characteristics and advantages will become better apparent from the description of preferred but not exclusive embodiments of a motor drive according to the invention, illustrated by way of non-limiting example in the accompanying drawings, wherein.

DETAILED DESCRIPTION

Figure 1:
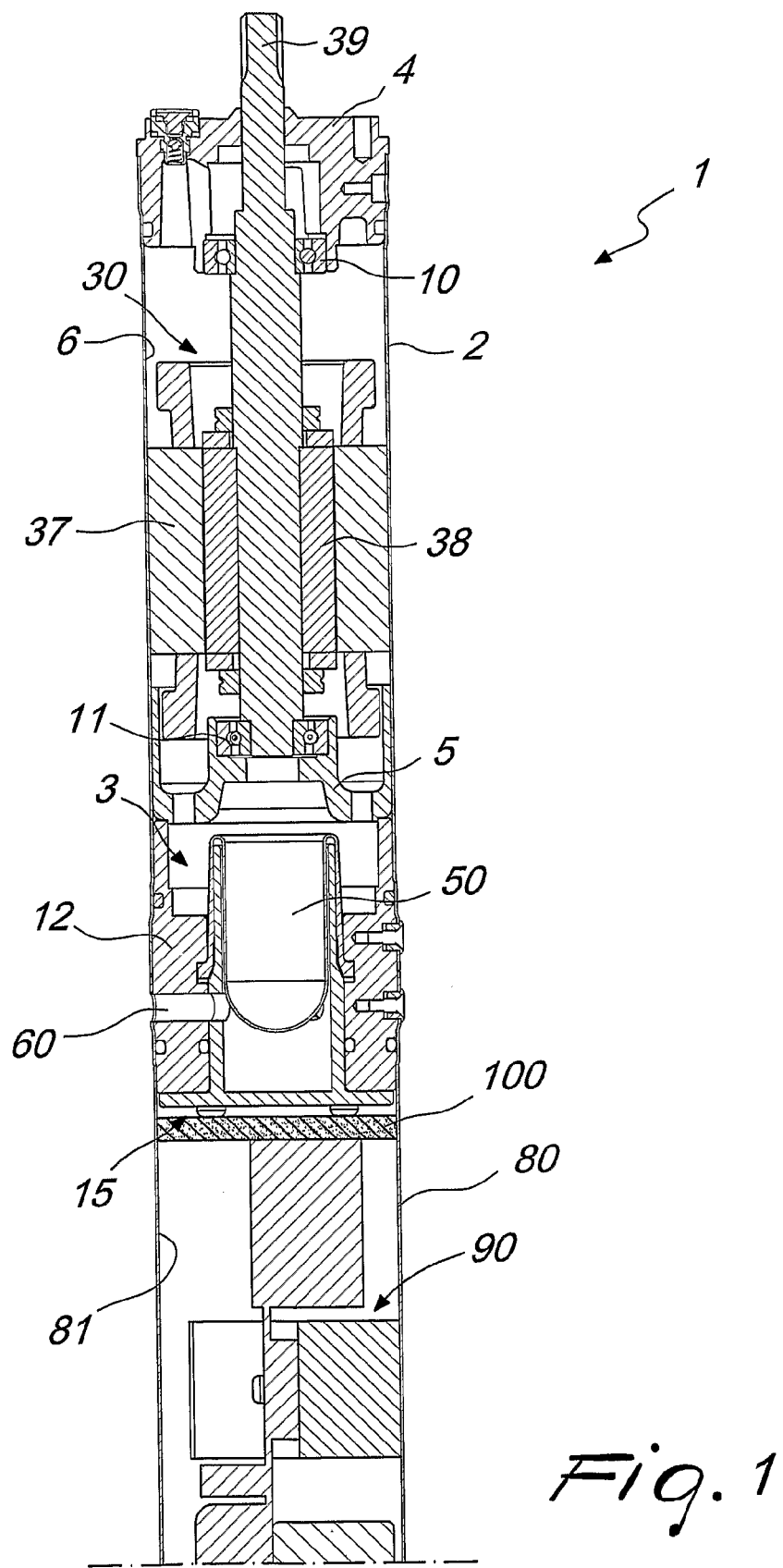
FIG. 1 is a sectional view of a motor drive according to the invention, taken along the plane I-I of FIG. 3.
Figure 2:
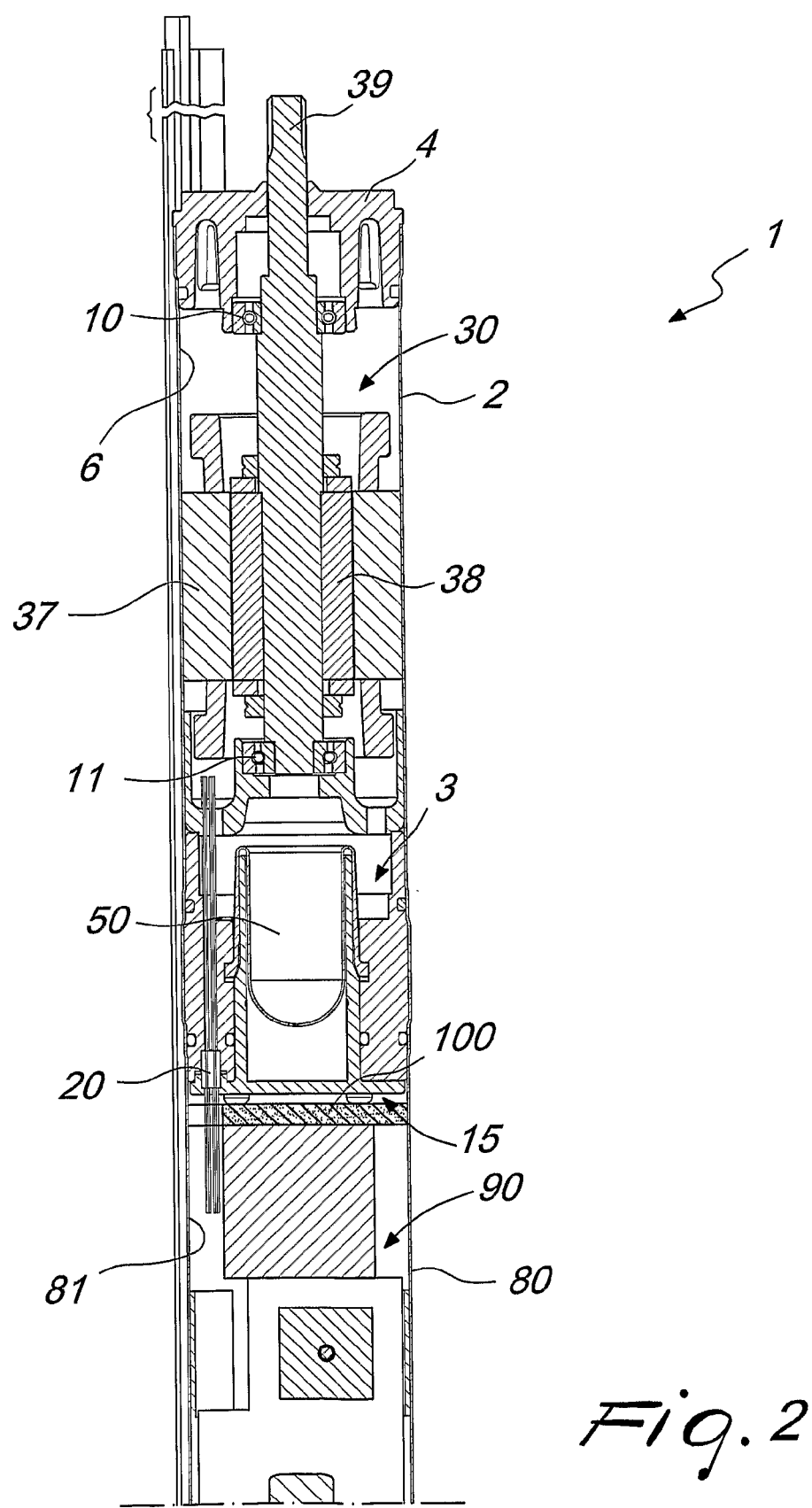
FIG. 2 is a sectional view of the motor drive according to the invention, taken along the plane II-II of FIG. 3.
Figure 3:
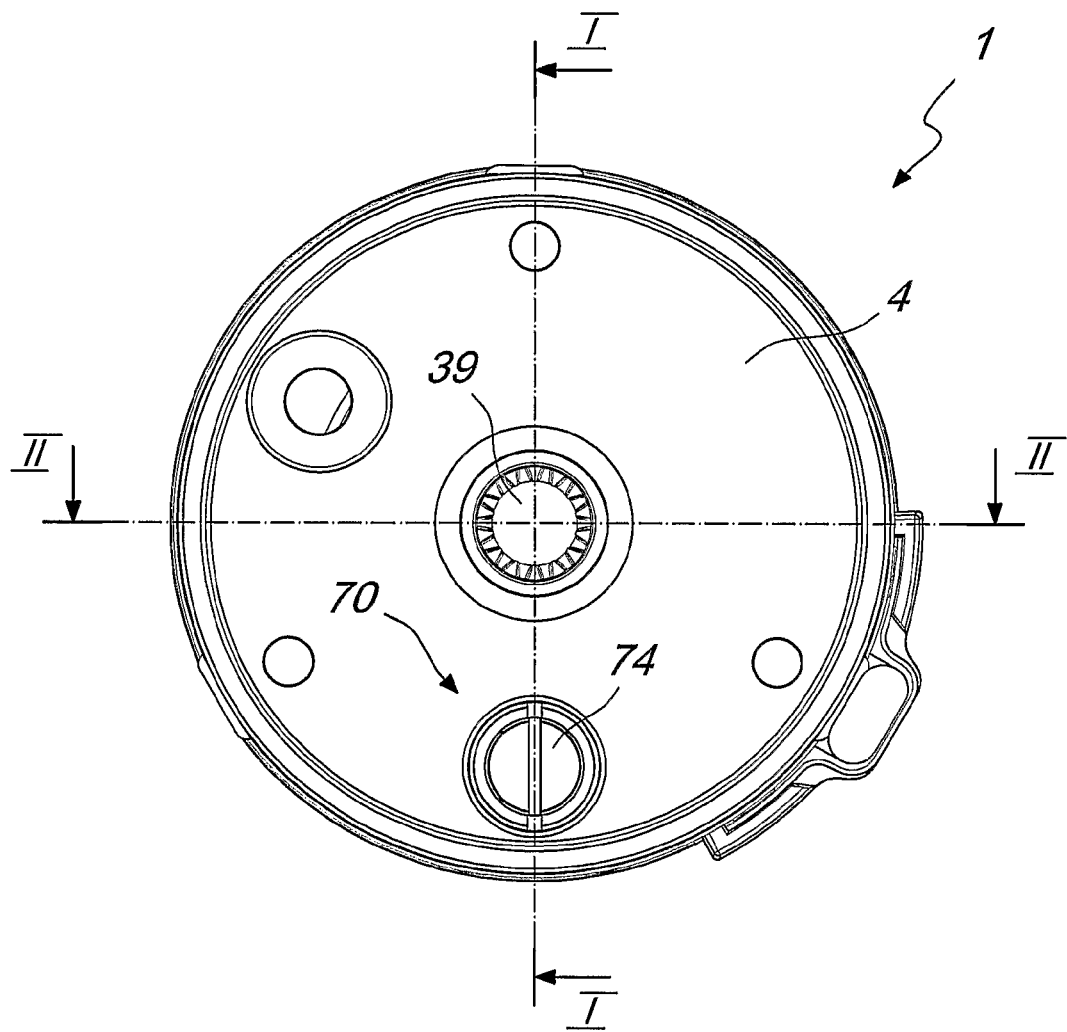
FIG. 3 is a plan view of the motor drive according to the invention.
Figure 4:
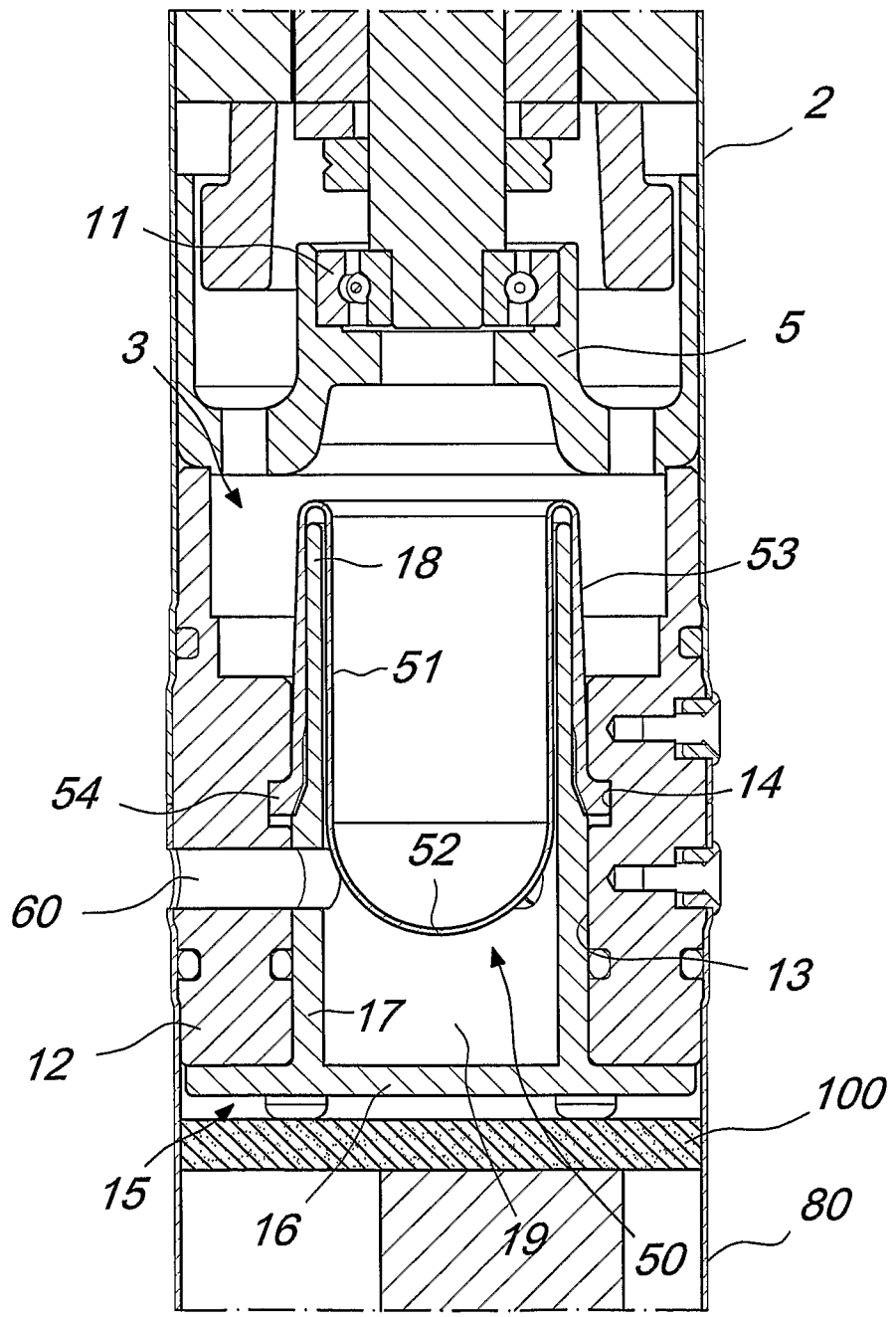
FIG. 4 is an enlarged-scale sectional view of a detail of the motor drive according to the invention.
Figure 5:
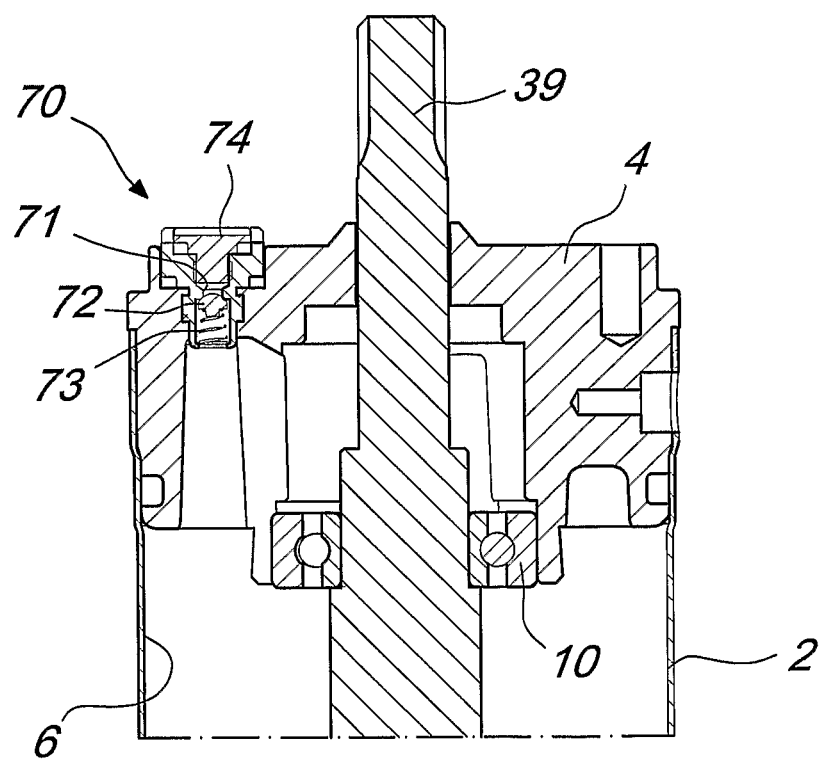
FIG. 5 is an enlarged-scale sectional view of another detail of the motor drive according to the invention.

With reference to the cited FIGS. 1 to 5, a motor drive, according to the invention, generally designated by the reference numeral 1, comprises a jacket 2 that is closed hermetically by a bottom 3 and a head 4, so as to form a first hermetic chamber 6.

The first hermetic chamber 6 accommodates an electric motor 30 immersed in a bath of dielectric cooling liquid. The liquid, preferably constituted by oil for food use, optimizes cooling and ensures a better lubrication effect, extending the life of all the moving parts and of the copper conductors.

The jacket 2 is constituted by a substantially cylindrical body, preferably made of corrosion-resistant metal, and is associated with an enclosure 80 which contains a power supply and control unit 90 that is connected to the electric motor 30.

The bottom 3 protrudes from the lower end of the jacket 2 and axially engages within the enclosure 80, closing it hermetically, so as to form a second hermetic chamber 81 that contains the power supply and control unit 90. Also the unit 90 is immersed in a bath of dielectric refrigerating liquid.

The electric motor 30 comprises a stator 37, which is accommodated within the first hermetic chamber 6 and is coupled to the jacket 2, and within which a rotor 38 rotates. The rotor 38 is coupled to a shaft 39 that is supported in its rotary motion by the head 4 and by a lower support 5 that rests on the bottom 3.

The shaft 39 is accommodated within at least two seats that are formed respectively on the head 4 and on the lower support 5 and are provided with antifriction guiding bearings 10 and 11 or, optionally, with lubricating rings or sliding bearings.

A rotary mechanical seal prevents the exchange of liquids between the inside and the outside of the first hermetic chamber 6. The rotary mechanical seal, which is not shown in the figures, is arranged on the head 4 at the output of the shaft 39 and is protected by a sand guard which prevents the infiltration of foreign particles.

According to the invention, the motor drive 1 comprises an improved compensation means, which balances the variations in volume of the dielectric cooling liquid and, during operation, creates a slight overpressure within the first hermetic chamber 6.

The improved compensation means is also adapted to create different physical conditions within the first hermetic chamber 6 and the second hermetic chamber 81, which are therefore substantially independent.

The motor drive 1 is provided with a first bellows member 50, which is accommodated in a first seat 13 that is formed in the bottom 3 and is arranged substantially between the first hermetic chamber 6 and the second hermetic chamber 81.

The first bellows member 50 is joined to the bottom 3 and constitutes part of one of the walls that form the first hermetic chamber 6.

Preferably, the first bellows member 50 is made of elastic material, preferably rubber, which is particular resistant to pressure and thermal stresses.

The first bellows member 50 comprises an elastic return portion which is substantially constituted by a first cylindrical body 51 that is closed at one end by a dome 52 and by a deformable supporting portion. The deformable supporting portion is constituted by a second cylindrical body 53. The second cylindrical body 53 is substantially coaxial to the first cylindrical body 51 and is blended to it.

An edge 54 is formed on the free end of the second cylindrical body 53 and is interlocked with an annular seat 14 formed in the first seat 13.

The bottom 3 is in fact constituted by a first hollow member 12, which is provided centrally with the first seat 13, and is coupled to one end of the jacket 2 and closed by a first removable cover 15.

The first cover 15 is made of a disk member 16. A tubular portion 17 extends centrally from the disk member 16.

While the disk member 16 is associated with the first member 12 to close the first seat 13, the tubular portion 17 is inserted in the first seat in order to delimit an expansion chamber 19, within the bottom 3. The expansion chamber 19 accommodates the elastic return portion of the first bellows member 50.

A substantially rigid frame 18 is formed at the free end of the tubular portion 17 and is inserted between the first cylindrical body 51 and the second cylindrical body 53.

As a consequence of a volumetric variation of the dielectric cooling liquid contained in the first hermetic chamber 6, the deformation of the first bellows member 50 substantially leads to an elongation of the elastic return portion, by virtue of the frame 18.

Preferably, the expansion chamber 19 is connected to the outside of the first hermetic chamber 6 allowing to transfer the hydrostatic thrust that acts on the entire motor drive 1 to the first bellows member 50.

The improved compensation means in fact also comprises one or more openings 60 shaped like slots, which are formed in the bottom 3 and correspondingly in the enclosure 80 or in the jacket 2.

The openings 60 are arranged substantially between the first hermetic chamber 6 and the second hermetic chamber 81 and connect the expansion chamber 19 to the environment in which the motor drive 1 is located, allowing in practice the transfer of the hydrostatic thrust to the first bellows member 50.

A counterpressure valve 70 is installed on the head 4 of the motor drive 1 and is constituted by a hole 71 and a flow control member 72, which blocks it and is kept in its seat by a pusher spring 73.

When inactive, the counterpressure valve 70 is protected by a screw-type removable plug 74.

The presence of the counterpressure valve allows to fill the first hermetic chamber 6 with the dielectric cooling liquid and also to optionally create an overpressure within the chamber, even in the inactive conditions.

The addition of further dielectric cooling liquid in the first hermetic chamber 6, when it is already filled, in fact elongates the elastic return portion of the first bellows member 50, leading to an additional increase in internal pressure.

An expansion compensation means for compensating the expansion of the dielectric cooling liquid is provided in the second hermetic chamber 81. The expansion compensation means absorbs the volumetric variations of the liquid and raises the limit of the operating temperature that can be reached in the second hermetic chamber 81, regardless of the physical conditions that exist in the first hermetic chamber 6.

The expansion compensation means substantially comprises one or more elastically compressible members 100, which are inserted within the second hermetic chamber 81.

The elastically compressible members 100 can be constituted for example by bodies made of closed-cell rubber or by a plurality of inert gas bubbles dispersed in the dielectric cooling liquid that fills the second hermetic chamber 81.

The wiring between the power supply and control unit 90 and the electric motor 30 is provided by a connection means, such as a sealed jack 20, or by hermetic grommets that are not shown in the figures.

Figure 6:
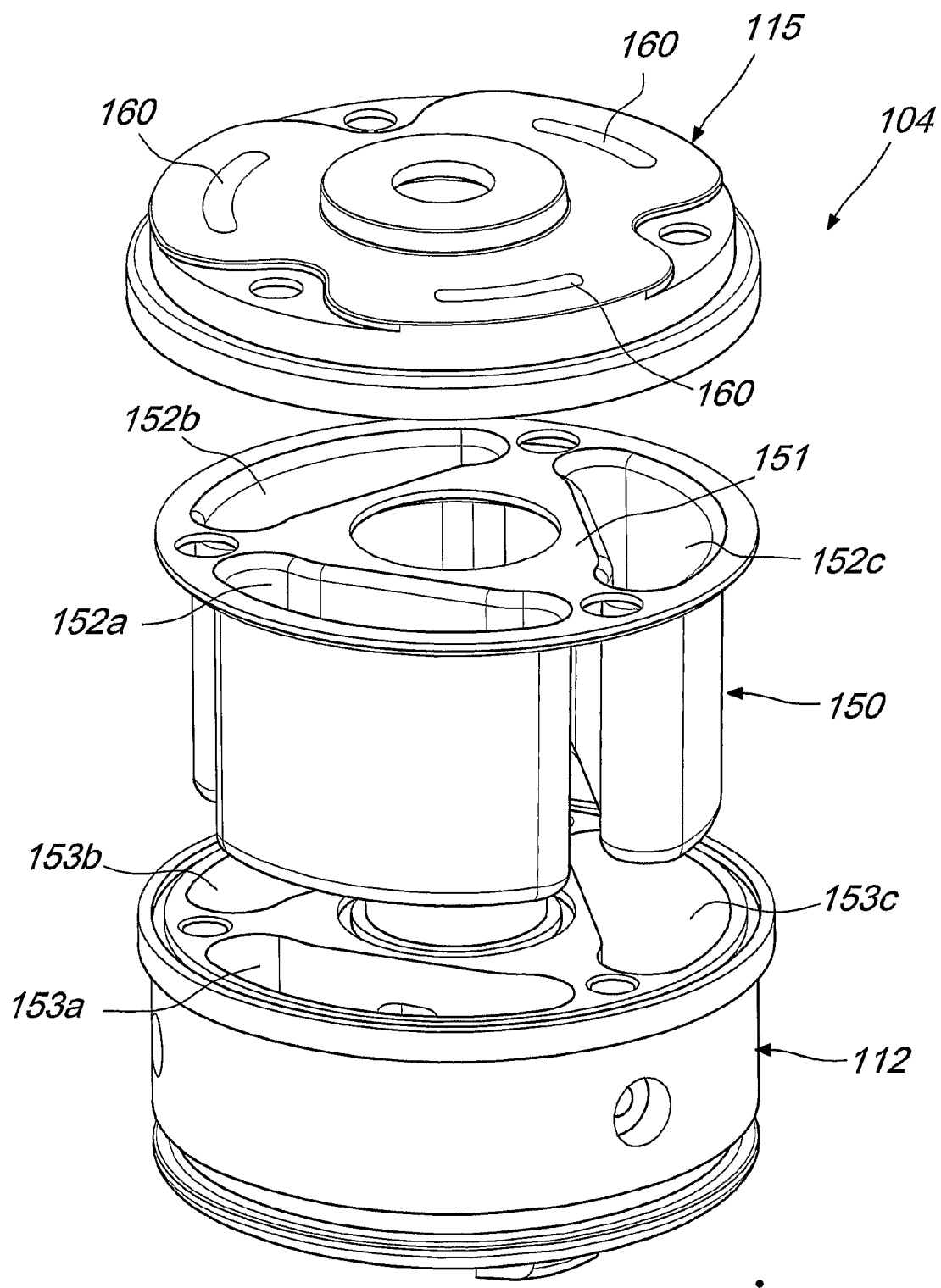
FIG. 6 is an enlarged-scale exploded view of a different embodiment of the detail of the preceding figure.
Figure 7:
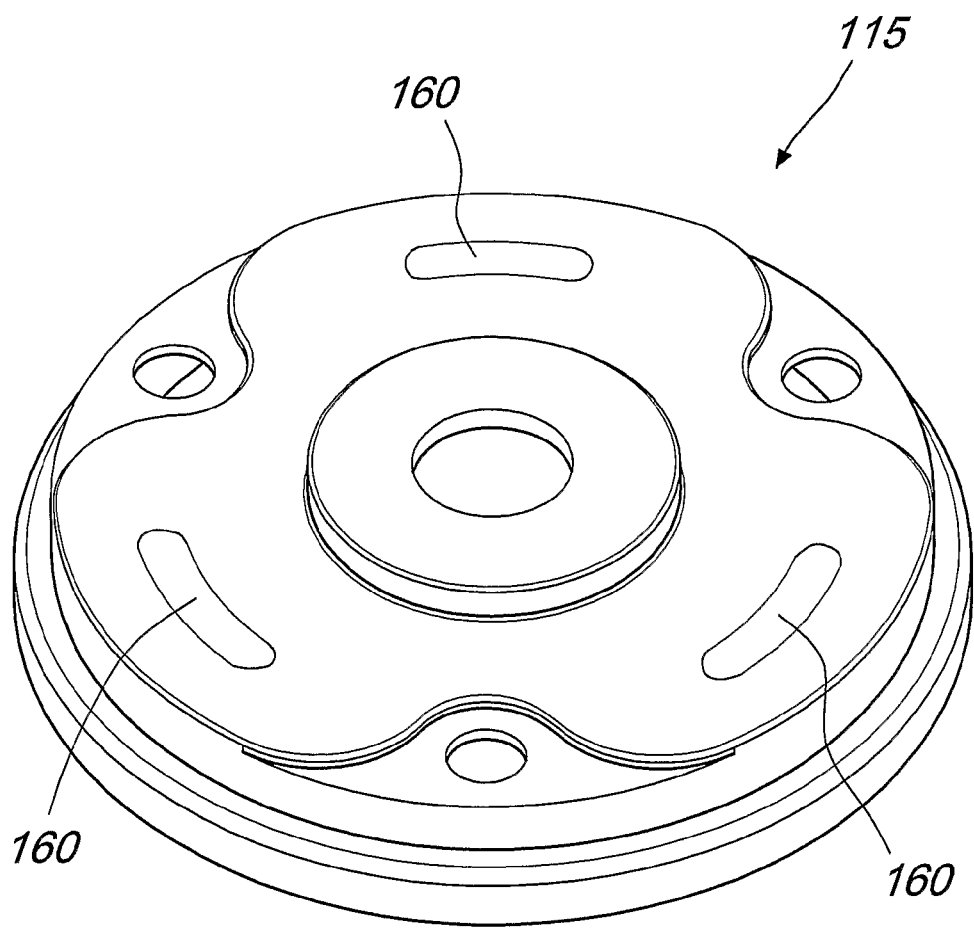
FIG. 7 is an enlarged-scale view of a detail of FIG. 6.

According to a second embodiment, illustrated in FIGS. 6 and 7, the improved compensation means is associated with a head 104 instead of with the bottom 3.

In this case, the compensation means comprises a second bellows member 150, which is elastically deformable and is provided with at least one plenum chamber and can be associated with the head 104 so as to constitute part of one of the walls that form the first hermetic chamber 6.

The second bellows member 150 comprises a base 151 and three plenum chambers 152a, 152b and 152c that protrude symmetrically from the base 151 and are respectively arranged in three hollows 153a, 153b and 153c. The shaped hollows 153a, 153b and 153c are substantially complementarily shaped to the plenum chambers and form a second seat on the head 100. The second seat is adapted to accommodate the second bellows member 150.

The head 104 comprises a second member 112, which is provided with the three hollows 153a, 153b and 153c and is jointly connected to the end of the jacket 2 that lies opposite the end that accommodates the bottom 3 and is closed by a second removable cover 115.

At least one second opening 160 provided on the second cover 115 is adapted to subject also the plenum chambers 152a, 152b and 152c to the hydrostatic pressure.

In the motor drive according to the invention, the volume variations of the dielectric cooling liquid contained in the first hermetic chamber 6, influenced both by the operating temperature of the electric motor 30 and by the hydrostatic pressure applied by the fluid in which the motor drive is immersed, are rebalanced by the improved compensation means, which also creates a slight overpressure within the first hermetic chamber 6.

The volumetric variation of the dielectric cooling liquid contained in the first hermetic chamber 6 in fact causes an elastic deformation of the first bellows member 50 or of the second bellows member 150.

The expansion of the first bellows member 50 leads essentially to an elongation of the elastic return portion, which responds to the stress with such a thrust as to cause a slight overpressure within the first hermetic chamber 6.

The positive pressure differential between the inside and the outside of the first hermetic chamber 6 generates a thrust on the rotary mechanical seal; such thrust reinforces the action of the springs and facilitates tightness.

Also, any additional overpressure, possibly generated within the first hermetic chamber 6 by virtue of the counter-pressure valve 70, is added to the overpressure generated by the improved compensation means, further increasing the positive difference in pressure between the inside and the outside and increasing the thrust on the rotary mechanical seal.

The introduction of a quantity of dielectric cooling liquid, that is greater than the amount strictly necessary for complete filling, in the first hermetic chamber 6, already in the inactive condition, in fact causes an elongation of the elastic return portion of the first bellows member 50 which accordingly pushes against the rotary mechanical seal, reinforcing the action of the springs.

It should also be noted that the improved compensation means is adapted to create physical conditions, within the first hermetic chamber 6, that are different and independent with respect to the physical conditions that exist in the second hermetic chamber 81.

While control of the pressure within the first hermetic chamber 6 is in fact ensured by the elastic deformations of the first bellows member 50 or of the second bellows member 150, the volume variations of the dielectric cooling liquid that fills the second hermetic chamber 81, caused by temperature variations, are in fact absorbed by the previously mentioned elastically deformable members.

In practice it has been found that the motor drive according to the invention fully achieves the intended aim and objects. In fact, while the motor drive is physically associated with a power supply and control unit, it is capable of balancing the variations in volume of the dielectric cooling liquid and allows to obtain the optimum physical conditions both for the electric motor and for the power supply and control unit itself.

In particular, while a pressure that is slightly higher than the hydrostatic pressure is created within the casing that contains electric motor, thus reinforcing the thrust action of the springs with which the rotary mechanical seal is equipped, the pressure remains substantially stable inside the enclosure that contains the power supply and control unit, by virtue of the action of the elastic compensation means, which absorbs the overpressure generated by the expansion of the dielectric refrigerating liquid.

Accordingly, the motor drive according to the invention is capable of minimizing the leaks of dielectric cooling liquid.

Also, the motor drive according to the invention, which is able to operate with the maximum allowed operating temperature for an equal hydrostatic pressure, allows to make the physical conditions that are present within the casing that contains the electric motor independent of the conditions that occur within the enclosure that contains the power supply and control unit.

The invention claimed is:

1. A motor drive, particularly for submersed electric pumps, comprising a jacket closed hermetically by a bottom and by a head in order to form a first hermetic chamber, said first hermetic chamber containing an electric motor that is immersed in a bath of dielectric cooling liquid, said jacket being associated with an enclosure in order to form a second hermetic chamber, said second hermetic chamber containing a power supply and control unit that can be connected to said electric motor, said motor drive comprising a compensation means that balances the variations in volume of said dielectric cooling liquid and generates an overpressure with said first hermetic chamber, said first hermetic chamber being substantially independent of said second hermetic chamber, said compensation means comprising a first elastic bellows member, which is accommodated in a first seat that is formed in said bottom and is arranged between said first hermetic chamber and said second hermetic chamber, said first elastic bellows member being joined to said bottom in order to form at least part of said first hermetic chamber, said bottom engaging axially within said enclosure in order to close said second hermetic chamber hermetically, said first elastic bellows member comprising an elastic return portion that is joined to a deformable supporting portion, said elastic return portion comprising at least one first cylindrical body that is closed at one end by a dome, said deformable supporting portion comprising at least one second cylindrical body that is joined coaxially to said first cylindrical body, a free end of said second cylindrical body being joined to said bottom.

2. The motor drive according to claim 1, wherein said bottom comprises a first hollow member that forms said first seat, said first hollow member being jointly connected to a first end of said jacket and being closed by a first detachable cover, said first detachable cover forming an expansion chamber that at least partially accommodates said first elastic bellows member, said expansion chamber being connected to an outside of said first hermetic chamber in order to transfer hydrostatic thrust to said first elastic bellows member.

3. The motor drive according to claim 2, wherein said first detachable cover comprises a disk member associated with said first hollow member, a tubular portion protruding centrally from said disk member and being inserted within said first seat, a free end of said tubular portion forming a substantially rigid frame that is inserted between said first cylindrical body and said second cylindrical body.

4. The motor drive according to claim 2, wherein said compensation means comprises at least one first opening that is formed in said bottom and correspondingly in said enclosure or said jacket, said first opening being arranged between said first hermetic chamber and said second hermetic chamber in order to connect said expansion chamber to said outside of said first hermetic chamber and allow the transfer of hydrostatic thrust to said first elastic bellows member.

5. The motor drive according to claim 1, wherein said improved compensation means comprises a second elastic bellows member, which is accommodated in a second seat that is formed in said head, said second elastic bellows member being joined to said head in order to form at least part of said first hermetic chamber.

6. The motor drive according to claim 5, wherein said second elastic bellows member comprises at least one plenum chamber that is joined to a base that is associated with said head.

7. The motor drive according to claim 5, wherein said head comprises a second hollow member that forms said second seat, said second hollow member being jointly connected to a second end of said jacket and being closed by a second removable cover.

8. The motor drive according to claim 7, wherein said compensation means comprises at least one second opening formed in said second removable cover, said second opening connecting the inside of said plenum chamber to said outside of said first hermetic chamber.

9. The motor drive according to claim 1, wherein said compensation means comprises a counterpressure valve that is joined to said head in order to allow the insertion of said dielectric cooling liquid within said first hermetic chamber and generation of an overpressure therein.

10. The motor drive according to claim 9, wherein said counterpressure valve comprises a hole that is formed in said head and a flow control member that is kept in a seat by a pusher spring in order to affect said hole, said hole being closed externally by a removable plug.

11. The motor drive according to claim 1, further comprising a connecting means that connects said power supply and control unit to said electric motor.

12. The motor drive according to claim 11, wherein said connecting means comprises at least one sealed jack.

* * * * *

UNITED STATES PATENT AND TRADEMARK OFFICE
CERTIFICATE OF CORRECTION

| | |
|---|---|
| PATENT NO. | : 8,680,729 B2 |
| APPLICATION NO. | : 13/145395 |
| DATED | : March 25, 2014 |
| INVENTOR(S) | : Sebastiano D'Amico, Ugo Turetta and Andrea Fongaro |

Page 1 of 1

It is certified that error appears in the above-identified patent and that said Letters Patent is hereby corrected as shown below:

On the Title Page: Item 73 should read

Assignee: EBARA CORPORATION

Signed and Sealed this
Twenty-third Day of December, 2014

Michelle K. Lee
*Deputy Director of the United States Patent and Trademark Office*